UNITED STATES PATENT OFFICE.

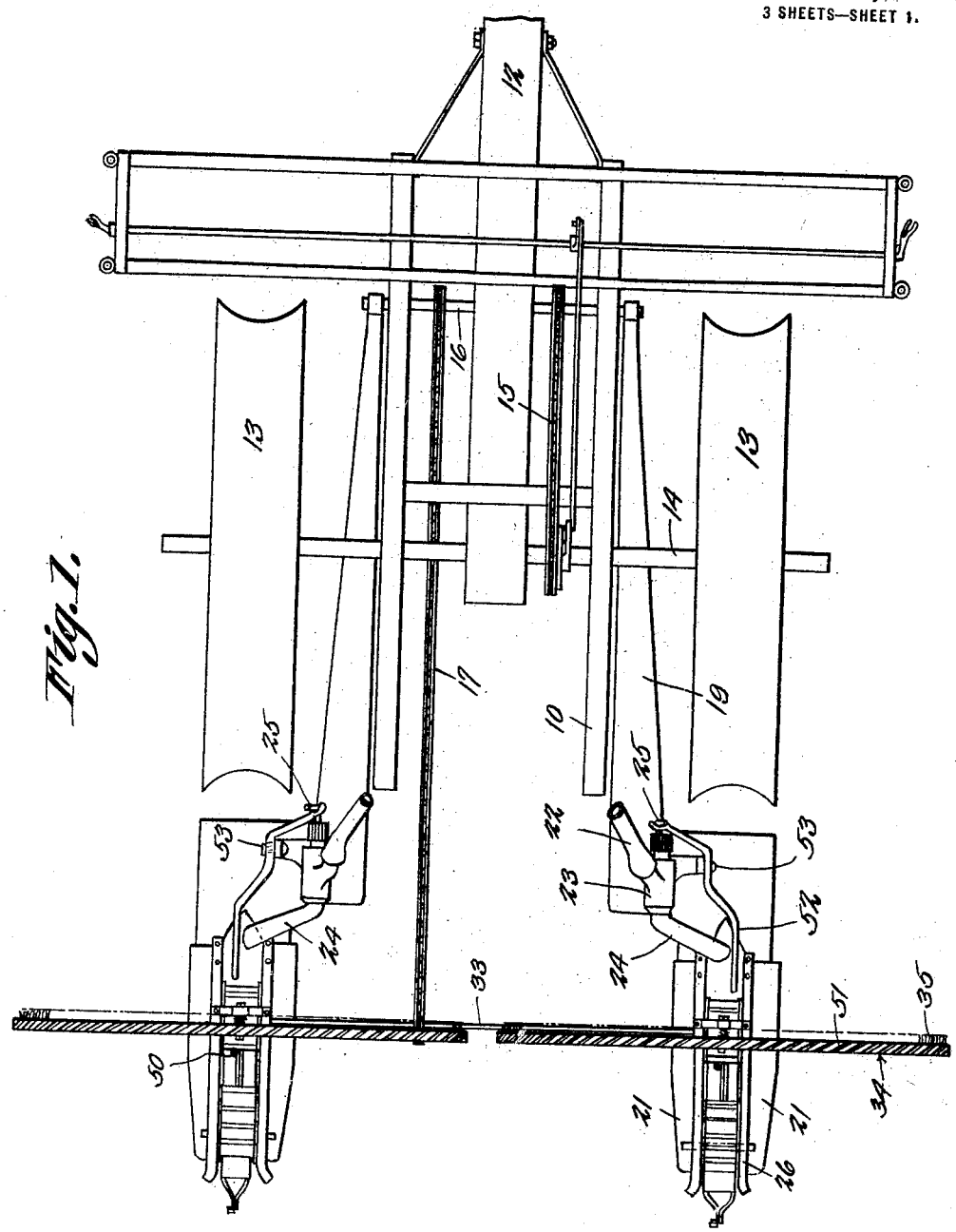

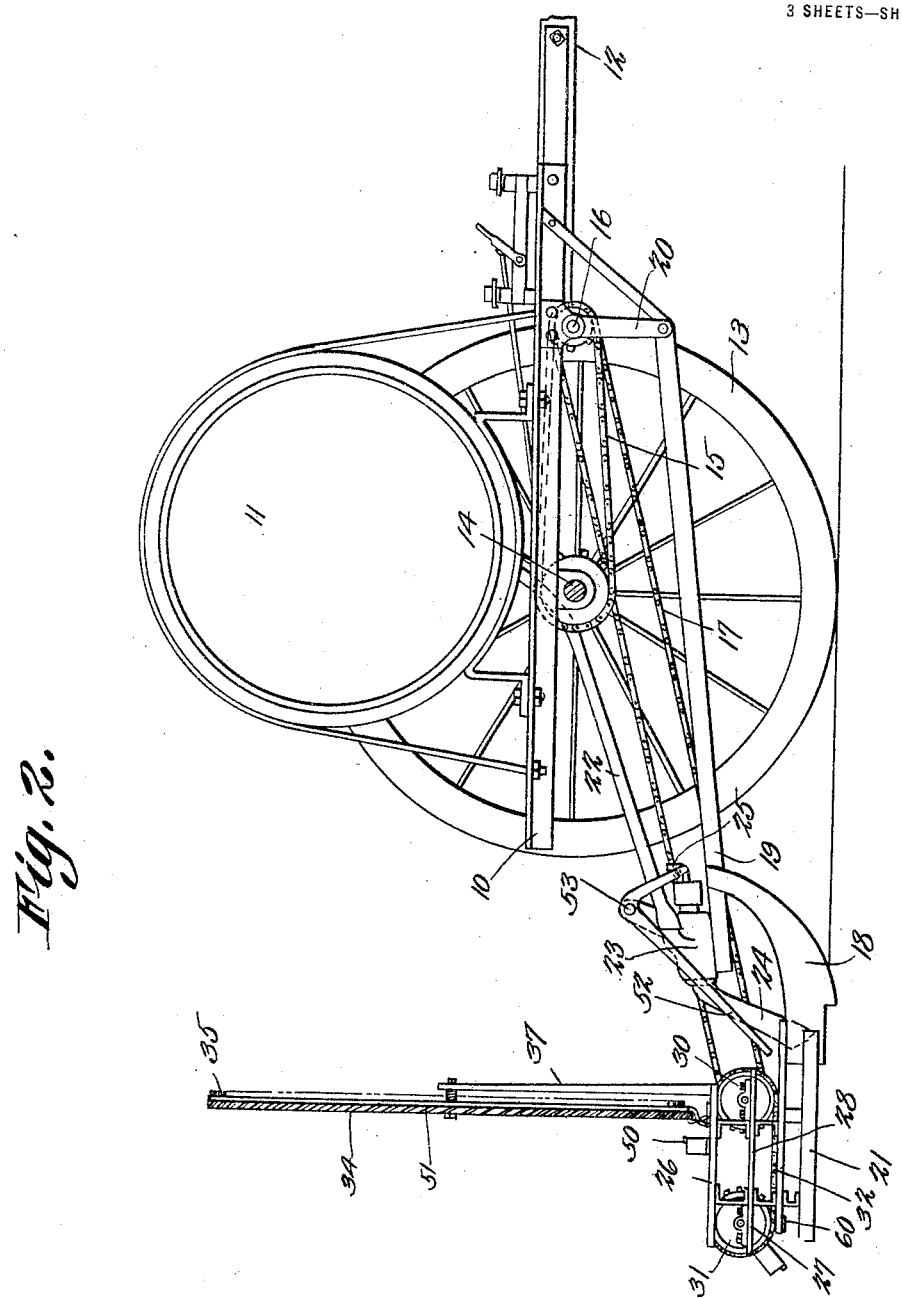

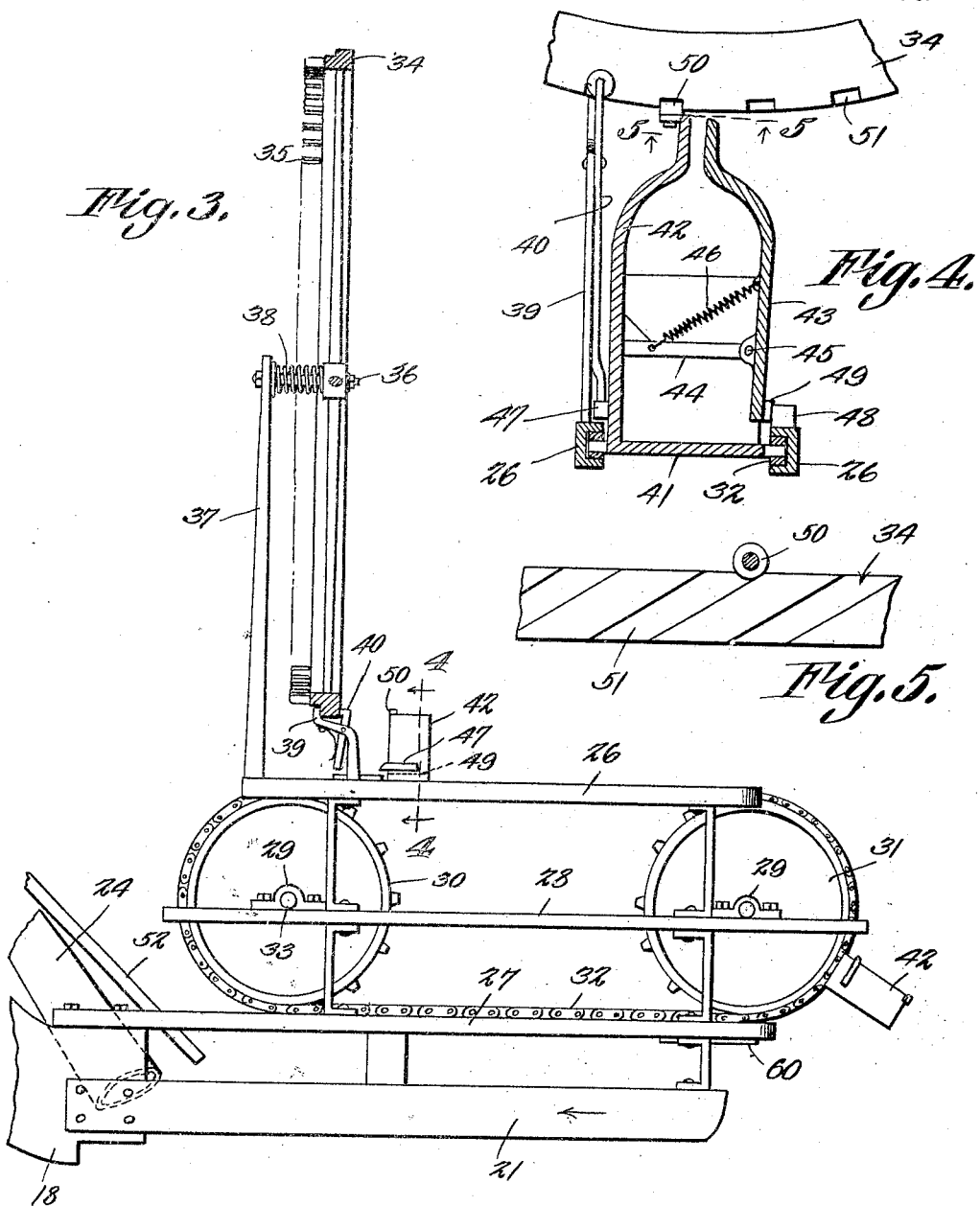

BENJAMIN F. CHANEY, OF BALTIMORE, MARYLAND.

TRANSPLANTER.

1,368,486.  Specification of Letters Patent.  Patented Feb. 15, 1921.

Application filed July 19, 1920. Serial No. 397,405.

*To all whom it may concern:*

Be it known that I, BENJAMIN F. CHANEY, a citizen of the United States, residing at Baltimore city, State of Maryland, have invented certain new and useful Improvements in Transplanters, of which the following is a specification.

This invention relates to machines for setting plants in the ground, and its object is to provide a novel and improved machine of this kind which makes a furrow in the ground, sets the plants in the furrow at regular intervals, and covers the plants thus set, these operations being automatically performed as the machine is drawn or driven over the ground.

The object stated is attained by means of a combination and arrangement of parts to be hereinafter described and claimed, and in order that the same may be better understood, reference is had to the accompanying drawings forming a part of this specification.

In the drawings:—

Figure 1 is a plan view of the machine minus a water tank; Fig. 2 is a side elevation thereof with the tank in place; Fig. 3 is an enlarged side elevation of a plant-setting mechanism; Fig. 4 is an enlarged cross section on the line 4—4 of Fig. 3, and Fig. 5 is a section on the line 5—5 of Fig. 4.

Referring specifically to the drawings, 10 denotes a wheeled frame supporting a tank 11 adapted to hold a supply of water, and provided with a tongue or pole 12 for attachment of the draft animals. However, it is immaterial how the frame is drawn or driven over the ground. The wheels 13 of the frame 10 are arranged to drive an axle 14 connected by a chain or other suitable drive 15 to a countershaft 16 from which latter the plant-setting mechanism is driven by a chain or other suitable means 17. This mechanism is actuated periodically by a check-wire having knots or equivalents engageable with the mechanism whereby the connection and disconnection of the driving means is effected, and as this is a well-known expedient a description thereof is not necessary.

The machine is provided with two plant-setting devices, and as they are alike, a description of one suffices for both. These devices trail behind the wheels 13, and include each a furrow opener 18 connected by a draw bar 19 to a hanger 20 carried by the frame 10.

Back of the furrow opener 18, and fastened thereto to travel along with the same, are two laterally spaced presser plates 21 between which the plants are deposited in the furrow made by the furrow opener, the presser plates packing moist earth around the roots of the plants, and covering the stems with dry fine dirt. The water for moistening the soil is obtained from the tank 11, from which latter a hose or other conduit 22 leads to a valve casing 23 having a discharge nozzle 24 positioned to discharge the water on the ground at the rear of the furrow opener 18. The water valve in the casing 23 has an operating stem 25 which is periodically actuated by a mechanism to be presently described.

The furrow opener 18 and the presser plates 21 support a frame including two pairs of vertically spaced channel bars 26 and 27 respectively, the members of each pair being laterally spaced. Between the top and bottom bars 26 and 27, are beams 28 carrying bearings 29 supporting the shafts of two pairs of sprocket wheels 30 and 31, respectively located between the pairs of top and bottom bars. Over the sprocket wheels 30 and 31 are trained two laterally spaced chains 32 carrying certain elements to be presently described. The chains 32 run in the channels of the bars 26, and are guided thereby. The bars 26 and 27, and the beams 29 extend in the direction of the length of the machine, and the chains 32 travel in the same direction the machine travels when it is driven over the field. The chains 32 are driven by the front sprocket wheels 30, the shaft 33 of the latter being driven from the countershaft 16 by the chain 17.

Positioned transversely of the chains 32, above the upper runs thereof, is a rotatable plant-carrying member in the shape of a wheel 34 armed on the front side of its rim with a large number of uniformly spaced spring or other suitable clips 35, each of which latter is adapted to hold a plant. The wheel is mounted on an axle 36 carried by a standard 37 rising from and supported by the top bars 26, said standard being shaped at the bottom to straddle the bars and allow certain devices on the chains 32 to pass. A spring 38 coiled around the axle 36 pressing against the wheel hub, serves to hold the wheel against turning except when operated on by certain devices to be presently described. The wheel is further held by having its rim positioned at the bottom between a pair of clamping jaws 39 and 40, respectively, the jaw 40 being pivoted to the jaw 39, and the latter being mounted on one of the bars 26.

The chains 32 carry a number of devices for unlocking or releasing the wheel 34, and after turning the same a predetermined distance, grasping one of the plants carried by said wheel, and then carrying said plant into the furrow made by the opener 18 and depositing it in said furrow. These devices consist each of the following parts:

Extending between the chains 32 and fastened thereto in any suitable and approved manner is a transverse plate 41 from one side of which projects the stationary jaw 42 of a plant-grasping member, the movable jaw 43 of said member being opposite the stationary jaw. From the jaw 42 extends a stem 44 to which the jaw 43 is pivoted as shown at 45 in Fig. 4. A spring 46 connected to the jaw 43 and anchored to the stem 44 normally holds said jaw closed. On the outer face of the jaw 42 is an outstanding abutment 17 positioned to be intercepted by the jaw 40. On one of the top bars 26 is an abutment 48 which is in the path of an abutment 49 on the outer face of the jaw 43. When the abutment 49 strikes abutment 48 the jaw 43 opens, and when the abutments pass each other, the jaw closes. The abutment 48 is so located that this action takes place when the jaws 42 and 43 are passing the wheel 34, with the result that one of the plants is removed from the wheel and carried away by the jaws.

The jaw 42 also carries a device for turning the wheel one step to properly present a plant to the plant grasping jaws 42 and 43. This device is a roller or other abutment 50 positioned to enter one of a series of oblique grooves 51 in the periphery of the wheel 34. These grooves extend entirely around the wheel and they are uniformly spaced. The roller 50 moves in a direction parallel to the axis of the wheel 34, and as the grooves are oblique, it will be evident that the passage of the roller through the groove will cause the wheel to rotate a distance depending on the obliquity of the groove. The grooves are designed to cause the wheel to turn a distance corresponding to the spacing of the clips 35 which carry the plants.

The machine is shown equipped with three plant-grasping members which operate in succession when the chain 32 is running. Each member first releases the wheel 34, then turns it a step to bring a plant in position to be grasped, and the plant is then taken off by the jaws 42 and 43, and carried to the furrow.

The following means are provided for releasing the plant and setting it in the furrow:

At the rear end of one of the beams 28 is positioned an abutment 60 similar to the abutment 48 and is so located that it intercepts the abutment 49 to open the jaw 43 and allow the plant to seat in the furrow. The presser plates 21 following pack moist earth around the plant and cover the stem with dry fine dirt. As the abutment 49 clears the abutment 60 the jaws 43 closes. As the plant grasping member passes the nozzle 24 it swings a lever arm 52 which is fulcrumed at 53 and operatively connected to the valve stem 25 to open the water valve, the water being discharged from the nozzle 24.

I claim:

1. In a plant setting machine, a rotatable plant-carrying member having means for supporting a plurality of plants, a gripper member for taking a plant from the carrying member, a traveling support for the gripper member for carrying the same past the carrying member and along the ground, means for operating the gripper member at the carrying member to grasp a plant, means for operating the gripper member to release and set the plant, and means for rotating the carrying member to present the plants thereon successively to the gripper member, said last-mentioned means being an abutment on the gripper member movable therewith in a direction parallel to the axis of the carrying member, the periphery of said carrying member having oblique grooves through which the abutment passes.

2. In a plant-setting machine, a rotatable plant-carrying member having means for supporting a plurality of plants, a gripper member for taking a plant from the carrying member, a traveling support for the gripper member for carrying the same past the carrying member and along the ground, means for operating the gripper member at the carrying member to grasp a plant, means for operating the gripper member to release and set the plant, means for rotating the carrying member to present the plants thereon successively to the gripper member, stationary and movable jaws between which the carrying member is positioned for holding said member stationary during the intervals between its actuations, and means carried by the gripper member for actuating the movable jaw to release the carrying member.

3. In a plant-setting machine, a rotatable plant carrying member having means for supporting a plurality of plants, a gripper member for successively taking the plants from the carrying member, said gripper member having a movable jaw, a traveling support for the gripper member for carrying the same past the carrying member and along the ground, an abutment on the movable jaw, a stationary abutment located to intercept said abutment at the carrying member for operating the movable jaw to grasp a plant, means for operating said jaw to release and set the plant, means for rotating the carrying member to present the plants thereon successively to the gripping member, stationary and movable jaws between which the carrying member is positioned for holding the carrying member stationary during the intervals between its actuations, and means carried by the gripper member for actuating the movable jaw to release the carrying member.

4. In a plant-setting machine, a rotatable plant carrying member having means for supporting a plurality of plants, a gripper member for successively taking the plants from the carrying member, said gripper member having a movable jaw, a traveling support for the gripper member for carrying the same past the carrying member and along the ground, an abutment on the movable jaw, a stationary abutment located to intercept said abutment at the carrying member for operating the movable jaw to grasp a plant, means for operating said jaw to release and set the plant, means carried by the gripper member for rotating the carrying member to present the plants thereon successively to the gripper member, stationary and movable jaws between which the carrying member is positioned for holding the carrying member stationary during the intervals between its actuations, and means carried by the gripper member for actuating the movable jaw to release the carrying member.

In testimony whereof I affix my signature.

BENJAMIN F. CHANEY.